US008763955B1

(12) United States Patent
Musgrave et al.

(10) Patent No.: US 8,763,955 B1
(45) Date of Patent: Jul. 1, 2014

(54) METHOD AND APPARATUS FOR CONTROLLING A REFUELING DROGUE

(75) Inventors: Jeffrey L. Musgrave, Renton, WA (US); Stephen M. Stecko, Fullerton, CA (US)

(73) Assignee: The Boeing Company, Chicago, IL (US)

( * ) Notice: Subject to any disclaimer, the term of this patent is extended or adjusted under 35 U.S.C. 154(b) by 1049 days.

(21) Appl. No.: 12/551,177

(22) Filed: Aug. 31, 2009

(51) Int. Cl.
*B64D 39/00* (2006.01)

(52) U.S. Cl.
USPC ............................................ 244/135 A

(58) Field of Classification Search
USPC .............. 244/135 A, 135 R, 136, 3, 1 TD
See application file for complete search history.

(56) References Cited

U.S. PATENT DOCUMENTS

| 5,188,313 | A  | * | 2/1993  | Piasecki ............... 244/135 A |
| 6,591,169 | B2 |   | 7/2003  | Jones et al. |
| 6,814,330 | B2 |   | 11/2004 | Jones et al. |
| 7,007,894 | B1 |   | 3/2006  | Takacs et al. |
| 7,185,854 | B2 |   | 3/2007  | Von Thal et al. |
| 7,219,857 | B2 |   | 5/2007  | Takacs et al. |
| 7,255,306 | B2 |   | 8/2007  | Jones et al. |
| 7,275,718 | B2 |   | 10/2007 | Saggio, III et al. |
| 7,377,468 | B2 | * | 5/2008  | Saggio, III et al. ....... 244/135 A |
| 7,438,259 | B1 | * | 10/2008 | Piasecki et al. ............... 244/175 |
| 2007/0252046 | A1 | * | 11/2007 | Miller et al. ................... 244/221 |
| 2008/0054124 | A1 |   | 3/2008  | Takacs et al. |
| 2008/0215191 | A1 | * | 9/2008  | Sundqvist ......................... 701/1 |
| 2008/0265097 | A1 |   | 10/2008 | Stecko et al. |
| 2008/0270027 | A1 |   | 10/2008 | Stecko et al. |

FOREIGN PATENT DOCUMENTS

| WO | WO 2008045116 A2 | * | 4/2008 | .............. B64C 39/02 |
| WO | WO 2010/059155 A1 |   | 5/2010 | |
| WO | WO 2010/065036 A1 |   | 6/2010 | |

* cited by examiner

*Primary Examiner* — Tien Dinh
*Assistant Examiner* — Richard R Green
(74) *Attorney, Agent, or Firm* — Alston & Bird LLP

(57) ABSTRACT

A method, apparatus and system are provided for facilitating aerial refueling by controlling a refueling drogue. In this regard, a respective error for at least one state associated with a hose or a drogue is provided, along with an indication of a current state of the drogue. An actuator command is then determined based upon the current state of the drogue, the respective error for at least one state associated with the hose or the drogue, and a current command that has been previously issued to the actuator. A command, that is, an updated command, may then be issued to the actuator carried by the drogue in order to reduce or eliminate the state error(s).

9 Claims, 4 Drawing Sheets

METHOD AND APPARATUS FOR CONTROLLING A REFUELING DROGUE

TECHNOLOGICAL FIELD

Embodiments of the present disclosure relate generally to aerial refueling and, more particularly, to methods and apparatus for controlling a refueling drogue.

BACKGROUND

Aerial refueling involves the transfer of fuel from one aircraft, such as from a tanker, to another aircraft, such as a receiver. For example, aerial refueling may be utilized in order to extend the range of aircraft traveling long distances over areas having no feasible landing or refueling points. Aerial refueling may be utilized by various types of aircraft including, for example, fixed wing aircraft and/or helicopters.

One system for facilitating aerial refueling is a probe and drogue aerial refueling system. In a probe and drogue aerial refueling system, a tanker may extend an elongate flexible hose having a drogue attached to its distal end, while a receiver aircraft having a refueling probe extending therefrom approaches the tanker. The refueling probe is configured to engage the drogue while in flight so as to initiate the transfer of fuel. Typically, the operator of the receiver aircraft from which the refueling probe extends is responsible for maneuvering the receiver aircraft such that the refueling probe enters and engages the drogue.

Unfortunately, the movement of the drogue can make the engagement of the refueling probe with the drogue a challenging task. Among other forces that act upon the drogue, the bow wave created by the receiver aircraft carrying the refueling probe may cause the drogue to be displaced. Additionally, wind gusts or the like may also cause the drogue to be displaced relative to the refueling probe. Such unexpected and unpredictable movement of the refueling drogue increases the complexity of the aerial refueling operation. As such, the time required for aerial refueling may increase, thereby potentially decreasing overall mission effectiveness. Further, the movement of the drogue could possibly cause damage to the hose and drogue assembly and/or to the receiver aircraft carrying the refueling probe.

In an effort to make contact with the drogue and avoid some of the movement of the drogue, pilots of the receiver aircraft carrying the refueling probe may sometimes intercept the drogue at relatively high velocities. While the interception of the drogue at a higher rate may overcome some of the complications introduced by the movement of the drogue, the interception of the drogue at a higher rate may create hose oscillation which may adversely affect the integrity of the hose and the delivery of fuel thereby.

In order to reduce the movement of a drogue, drogues have been designed with passive disturbance suppression, such as by means of the drogue canopy design. In this regard, drogues having somewhat different passive disturbance suppression systems may be designed for different air speed ranges. Further, the passive disturbance suppression of a drogue may be coupled with active tension control in order to further reduce the movement of the drogue. However, drogues having passive disturbance suppression may still move more in an unexpected and unpredictable manner than is desired. For example, drogues having passive disturbance suppression may not be able to reject bow waves that tend to push the drogue away from a refueling probe.

Therefore, it may be desirable to provide a method, apparatus and system that may overcome one or more of the issues described above, as well as other possible issues.

BRIEF SUMMARY

In accordance with one embodiment, a method, apparatus and system are provided for facilitating aerial refueling. In this regard, a method and apparatus are provided according to embodiments of the present disclosure for controlling a refueling drogue, thereby facilitating the engagement of the drogue with a refueling probe in a manner that may decrease the time required for such engagement and which may therefore increase overall mission effectiveness while reducing the possibility of damage attributable to the aerial refueling operation.

In one embodiment, a method of controlling a refueling drogue is provided. The method receives a respective error for at least one state associated with a hose or a drogue. The method may also receive an indication of a current state of the drogue. The method of this embodiment may also determine a command to be issued to an actuator carried by the drogue based upon the current state of the drogue, the respective error for at least one state associated with the hose or the drogue, and a current command that has been previously issued to the actuator. In accordance with the method of this embodiment, a command, that is, an updated command, may then be issued to the actuator.

In another embodiment, an apparatus for controlling a refueling drogue may be provided. The apparatus may include a processor that is configured to receive a respective error for at least one state associated with a hose or a drogue. The processor may also be configured to receive an indication of the current state of the drogue. The processor may be configured to determine a command to be issued to an actuator carried by the drogue based upon the current state of the drogue, the respective error for at least one state associated with the hose or the drogue and a current command that has been previously issued to the actuator. The drogue may then be configured to issue a command to the actuator.

In a further embodiment, a refueling system is provided that includes a refueling drogue comprising at least one actuator and processor. The processor is configured to receive a respective error for at least one state associated with a hose or a drogue. The processor is also configured to receive an indication of the current state of the drogue. Further, the processor is configured to determine a command to be issued to the actuator based upon the current state of the drogue, the respective error from at least one state associated with the hose or the drogue and a current command that has been previously issued to the actuator. Further, the processor of this embodiment may be configured to issue the command to the actuator.

In the foregoing embodiments, the respective error that is received may include errors for at least one state associated with the hose and at least one state associated with the drogue. The respective error may, in one embodiment, include the respective rate error for at least one state associated with the hose or the drogue. For example, the respective rate error may include at least one of an error for a hose elevation rate, an error for a hose azimuth rate, an error for a drogue pitch rate, an error for a drogue yaw rate or an error for a drogue roll rate.

In one embodiment, a representation of dynamic pressure may also be received with the command to be issued to the actuator being determined based also on the dynamic pressure. The refueling drogue of one embodiment may include a plurality of actuators. In this embodiment, the determination of the command may include the determination of a respective command to be issued to each of the plurality of actuation devices. As such, the issuance of the command in accordance with this embodiment may also include the issuance of the respective command to each of the plurality of actuation devices.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWINGS

Figure 1:
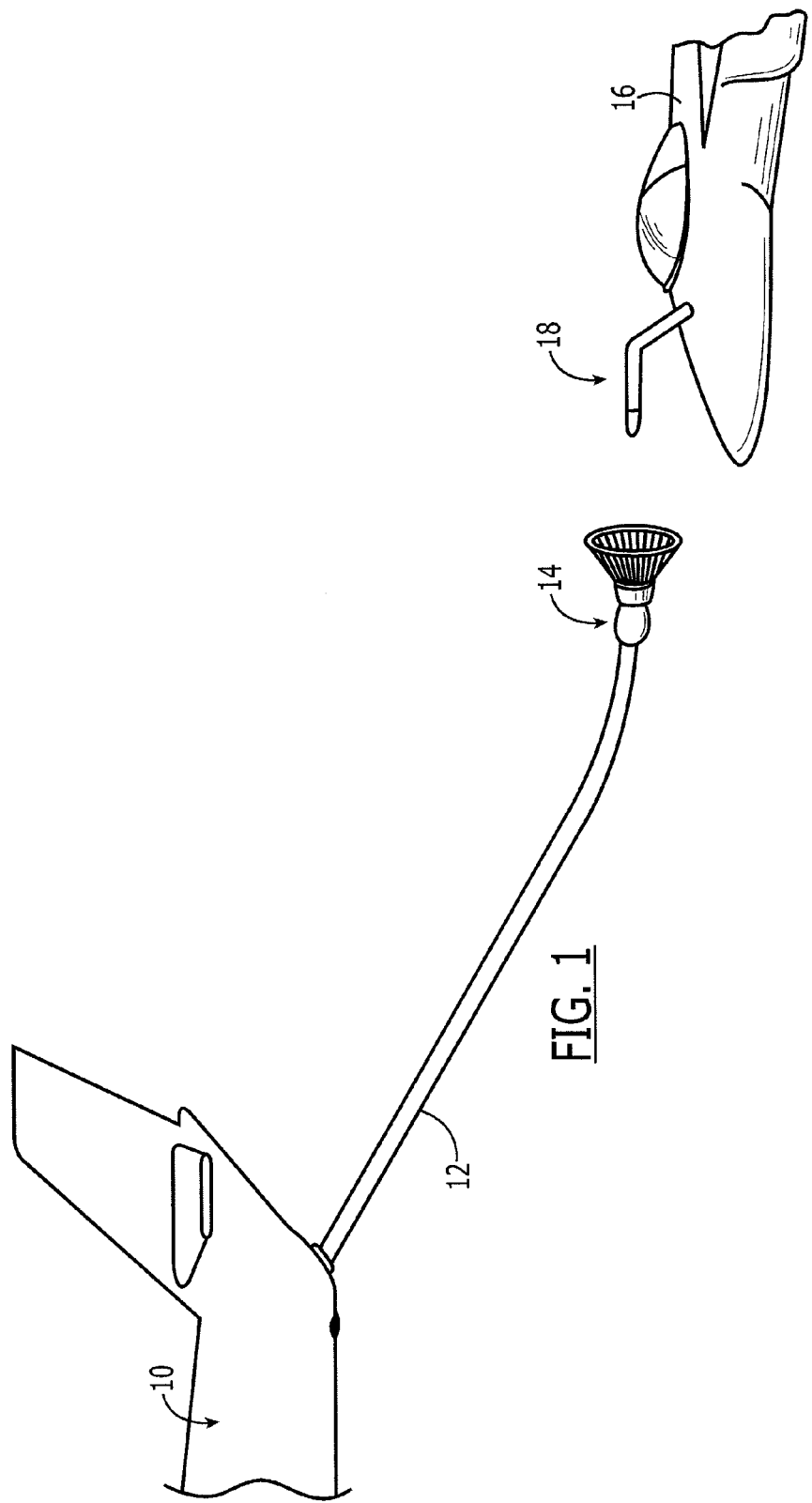
Figure 2:
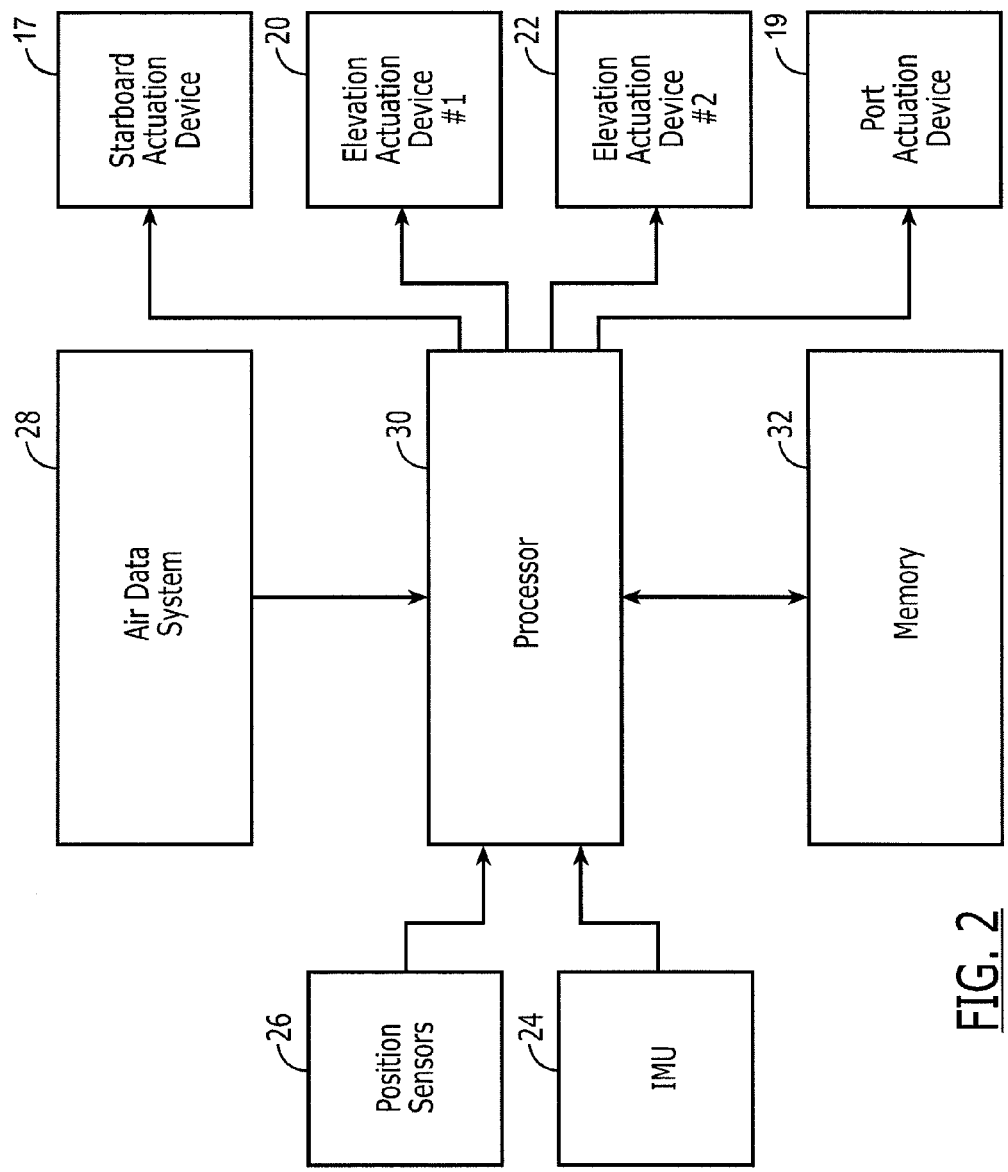
Figure 3:
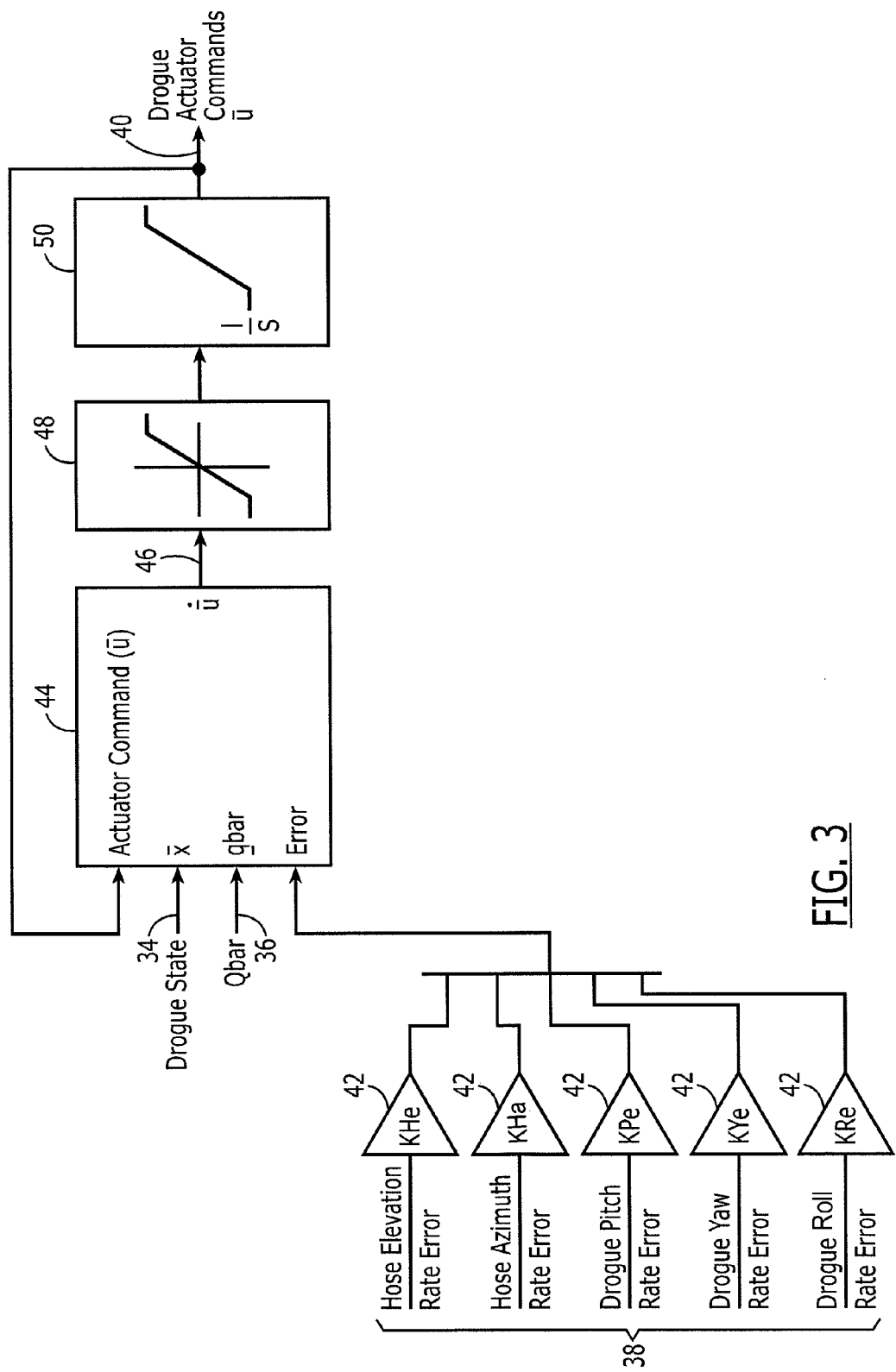
Figure 4:
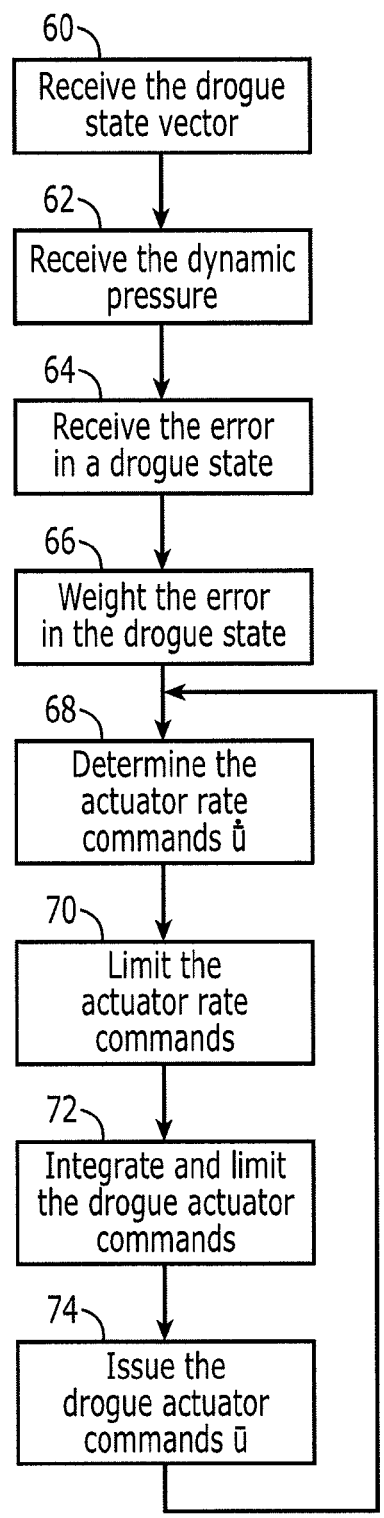

Having thus described the disclosure in general terms, reference will now be made to the accompanying drawings, which are not necessarily drawn to scale, and wherein:

FIG. 1 is a schematic representation of a tanker aircraft having an elongate hose and a refueling drogue as well as a receiver aircraft having a refueling probe extending therefrom according to one embodiment of the present disclosure;

FIG. 2 is a block diagram of a refueling system having a refueling drogue with at least one actuator and a processor for controlling the refueling drogue in accordance with embodiments of the present disclosure;

FIG. 3 is a block diagram of operations performed by a control mixer for controlling a refueling drogue in accordance with embodiments of the present disclosure; and FIG. 4 is a flowchart of the operations performed for controlling a refueling drogue in accordance with embodiments of the present disclosure.

DETAILED DESCRIPTION

The present disclosure now will be described more fully hereinafter with reference to the accompanying drawings, in which some, but not all embodiments are shown. Indeed, these embodiments may have many different forms and should not be construed as limited to that which is set forth herein; rather, these embodiments are provided so that this disclosure will satisfy applicable legal requirements. Like numbers refer to like elements throughout.

Referring now to FIG. 1, an aerial refueling operation is depicted. In this regard, a tanker aircraft 10 has an elongate hose 12 extending therefrom. The elongate hose includes a proximal end that is carried by the tanker aircraft and may be operably engaged with a fuel reservoir that is also carried by the tanker aircraft. The fuel reservoir may be located within the fuselage, wing structure or other compartment within the tanker aircraft. The elongate hose may be configured to be taken up from the extended position and may, for example, be rolled up on a rotating drum assembly that may be disposed within the tanker aircraft, such as within the fuselage of the tanker aircraft. The distal end of the elongate hose generally extends aft and below the tanker aircraft. A refueling drogue 14 may be operably engaged with the second end of the elongate hose so as to be in fluid communication therewith. As shown in FIG. 1, a receiver aircraft 16 carrying a refueling probe 18 may approach the tanker aircraft, such as from the aft and below, in an effort to engage the refueling probe with the drogue and to thereafter provide for aerial refueling of the receiver aircraft. While the aerial refueling operation is depicted in FIG. 1 in conjunction with fixed wing aircraft, other types of aircraft may also rely upon aerial refueling including, for example, helicopters.

The refueling drogue 14 may include one or more actuators. The refueling drogue can include a variety of different types of actuators. For example, the refueling drogue can include canopy actuators that can serve to position portions of the canopy in either an expanded state in which the respective portion of the drogue has a larger profile or a retracted state in which the respective portion of the drogue has a reduced profile as described, for example, by U.S. Pat. No. 7,219,857 to John F. Takas, et al. Alternatively, the refueling drogue may include one or more actuators in the form of a ruddevator as described, for example, by PCT Application No. PCT/US08/85587 filed Dec. 4, 2008. While two types of actuators have been described, the refueling drogue may include other types of actuators in other embodiments, including, for example, control surfaces.

In one embodiment, depicted schematically in FIG. 2 and described below, the refueling drogue 14 includes a plurality of actuators. For example, a refueling drogue may include a starboard actuator 17 and a port actuator 19 for providing deflection or other controlled movement in the azimuth direction. In this embodiment, the starboard actuator may be configured to provide control relative to movement of the refueling drogue in a starboard direction, and the port actuator may be configured to provide control relative to the movement of the refueling drogue in a port direction. In addition or alternatively, the drogue may include first and second elevation actuators 20 and 22. The first and second elevation actuators may be configured to provide control relative to movement of the refueling drogue in opposite vertical directions, such as upwardly and downwardly directions. While one embodiment of a refueling drogue having four actuators is described, a refueling drogue may include any number of actuators and the actuators may be positioned or otherwise configured so as to provide control of the refueling drogue in any number of different directions.

Referring now to FIG. 3, a control mixer for controlling a refueling drogue 14 according to embodiments of the present disclosure is depicted. The control mixer depicted in FIG. 3 may be automated and is generally implemented by means of a computer, such as a flight control computer or the like. As such, the control mixer may be embodied in a computer program product which directs the flight control computer to issue appropriate commands to the plurality of actuators in order to control the drogue as desired.

The control mixer receives a number of input parameters. As shown in FIG. 3 and in block 60 of FIG. 4, the control mixer may receive an indication of the current state 34 of the drogue 14. In one embodiment, a drogue state vector $\bar{x}(t)$ may be received, which includes the angular positions and/or rates of the hose and drogue assembly. The respective states of the drogue state vector may be measured directly or estimated by means of a model having an extended Kalman filter. With regard to the measurement of the respective states of the drogue state vector, an inertial measurement unit (IMU) 24 and/or position sensors 26 may be provided as shown in FIG. 2 in order to provide acceleration and position information regarding the refueling drogue and the hose relative to the elevation axis and the azimuth axis. In this regard, the inertial measurement unit may provide acceleration information including angular rate and linear acceleration, while the position sensors may provide position information including angular position. Although the drogue state vector may include a wide variety of different states, the drogue state vector of the illustrated embodiment includes the hose elevation angle and rate, the hose azimuth angle and rate, the drogue pitch angle and rate, the drogue yaw angle and rate and the drogue roll angle and rate, as provided by the inertial measurement unit.

The control mixer of FIG. 3 may also receive a dynamic pressure 36 for the aircraft 10 which may be measured, for example, by an air data system 28. See, for example, FIG. 2 and block 62 of FIG. 4. In addition to the drogue state vector 34 and the dynamic pressure, the control mixer may also receive errors for the various drogue states 34, as indicated by block 64 of FIG. 4. In regard to the illustrated embodiment, for example, the hose elevation rate error, the hose azimuth rate error, the drogue pitch rate error, the drogue yaw rate error and the drogue roll rate error may be received. However, in embodiments in which the drogue state vector includes additional or different states, the errors may likewise include additional or different types of errors. In these examples, an acceleration error may be the difference between the desired rate and the actual rate multiplied by a predefined gain. With respect to the hose elevation rate, for example, the hose elevation rate error may be the difference between the desired hose elevation rate and the actual hose elevation rate. As noted above, the actual rate may be measured, such as by means of the inertial measurement unit 24.

As shown in FIG. 3, a drogue control mixer of one embodiment may therefore receive a drogue state vector $\bar{x}(t)$ (designated as element 34), the dynamic pressure qbar (designated as element 36) and the various state errors 38 and may then process the various state errors to generate drogue actuator commands $\bar{u}(t)$ (designated as element 40) to control the actuator(s) of the drogue 14. The control mixer may operate a relatively continuous process with the updated acceleration and position of the refueling drogue being repeatedly sensed by the various position sensors 26 and the inertial measurement unit 24 and then provided as position information and acceleration information from which the state errors may be determined. The state errors are, in turn, provided to the control mixer for the generation of updated actuator commands. As a result, the sensors may substantially continuously sense and send position and acceleration information. In this manner, the control mixer may determine and then utilize the various state errors to control the actuator(s) of the drogue to reduce the state errors and thus bring the difference between the desired states and the actual states closer to zero. In one embodiment, the actuator commands may also change substantially continuously as the state errors change. In other words, the actuator commands may be substantially continuously generated to reduce or minimize state errors.

The control mixer may assign priorities to the state errors 38 by weighting the state errors. In this regard, the control mixer may include a weighting matrix K having a respective weight associated with each state error with the weight establishing the relative priority of the respective state error. In regards to the embodiment of FIG. 3, the weighting matrix K is depicted with individual weights 42 being associated with the respective state errors. See also block 66 of FIG. 4. For example, the weighting matrix may establish a priority for drogue pitch rate error as represented, for example, by a relatively large weight such that the control mixer may generate actuator commands to reduce and/or minimize drogue pitch rate error before or more quickly than drogue yaw rate error. In another example, the weighting matrix may establish a priority for drogue yaw rate error such that the control mixer may generate actuator commands to reduce and/or minimize drogue yaw rate error before or more quickly than drogue pitch rate error. In yet other examples, the weighting matrix may establish equal priority for both drogue pitch rate error and drogue yaw rate error such that those state errors may be processed and reduced at the same time in the same manner. The priority as established by the weighting matrix may be determined by the designer of the control mixer.

After priority is established, the weighted state errors may be provided to a control authority matrix B (designated as 44 in the embodiment of FIG. 3), along with the drogue state vector $\bar{x}$ and the dynamic pressure qbar. The control authority matrix B is an element of and may be constructed by the control mixer as the transpose of a control effectiveness matrix with the control effectiveness matrix being constructed to determine the required movement of the actuator(s) to create the acceleration errors. By taking the transpose of this matrix, the control authority matrix may allow for determining the required movement of the actuator(s) to counter and/or negate the acceleration errors. Thus, the control authority matrix may represent the transpose matrix of the control effectiveness matrix derived from wind tunnel testing, flight testing, or from some other form of analysis. More specifically, the forces and moments created by movement of the actuator may be measured through wind tunnel testing of model actuator(s). Processing the derivative of moments with respect to movement of the actuator(s) may allow for determining the control effectiveness of the actuator(s) being tested.

In other words, the control authority matrix B is defined to represent changes in the respective state acceleration of the drogue 14 in response to changes in the plurality of actuators. The matrix includes a plurality of terms with each term representing the change in a respective state acceleration of the drogue in response to the change of a respective actuator. As such, the matrix represents the manner in which the drogue is anticipated to respond to changes in the actuators. Typically, the matrix is constructed to have a plurality of rows and a plurality of columns. Each column generally includes a plurality of terms, each of which defines the anticipated change in a respective state acceleration of the drogue in response to the change in the same actuator. Thus, each column of the matrix represents the anticipated changes in the state acceleration of the drogue due to a change of a respective actuator.

In one embodiment, the control authority matrix B is an n×m matrix, where an n is the number of states and m is the number of actuation devices. For example, in an embodiment in which the control mixer receives a drogue state vector $\bar{x}$ having ten different states with five of the different states, e.g., the various drogue rates, affecting the drogue acceleration and the drogue has four actuators, the control authority matrix may be a 5×4 matrix by assembling the rows based on the states that affect the drogue acceleration. The control authority matrix allows for the state acceleration errors to be translated into a corresponding movement of the associated actuator. In other words, the control authority matrix may use the weighted state acceleration errors to determine the movement to be imparted by the actuator to reduce and/or minimize the rate errors, which act as surrogate acceleration errors when multiplied by a gain. Thus, the control authority matrix may represent the physical behavior of the actuator and their influence on the acceleration errors.

The control authority matrix B may be constructed by a variety of techniques. In one technique, the matrix is constructed as result of numerical calculations. In this technique, the current states $\bar{x}$ of the drogue 14 and the current settings of the actuators $\bar{u}$ are provided. Based upon the current states of the drogue and the current settings of the actuators, the resulting forces and torques acting upon the drogue are determined. By factoring out the mass and inertia of the drogue, the state accelerations may be determined.

In order to determine the resulting forces and torques acting upon the drogue, the aerodynamic coefficients for the current flight condition, as defined by the current states x of the drogue are determined, such as based on aerodynamic databases or otherwise known to those skilled in the art. The resulting forces and torques upon the drogue can then be determined based upon the aerodynamic coefficients and the mass of the drogue by means of force buildup equations, also known to those skilled in the art. The anticipated changes in the state accelerations of the drogue may then be determined analytically from force buildup equations and reaction forces.

In regards to the illustrated embodiment, the rate of change of each state $\bar{x}(t)$ can be defined as follows:

$$\dot{\bar{x}}(t) = f(\bar{x}(t), \bar{u}(t), qbar)$$

wherein $\bar{x}(t)$ represents the drogue state vector including both position and rate information, $\bar{u}(t)$ represents the current actuator commands, qbar represents the dynamic pressure and the functional relationship between $\dot{\bar{x}}(t)$ and $\bar{x}(t)$, $\bar{u}(t)$ and qbar can be defined as described above with the rate of change of each drogue rate being an acceleration. As such, the control authority matrix B for a system having a drogue state vector with five states that affect drogue acceleration, such as hose elevation rate, hose azimuth rate, drogue pitch rate, drogue yaw rate and drogue roll rate, and a refueling drogue having four actuators may be represented as follows:

$$B(\bar{x}, \bar{u}, qbar) = \begin{bmatrix} \frac{\partial f_1(\bar{x}, \bar{u}, qbar)}{\partial u_1} & \frac{\partial f_1(\bar{x}, \bar{u}, qbar)}{\partial u_2} & \frac{\partial f_1(\bar{x}, \bar{u}, qbar)}{\partial u_3} & \frac{\partial f_1(\bar{x}, \bar{u}, qbar)}{\partial u_4} \\ \frac{\partial f_2(\bar{x}, \bar{u}, qbar)}{\partial u_1} & \frac{\partial f_2(\bar{x}, \bar{u}, qbar)}{\partial u_2} & \frac{\partial f_2(\bar{x}, \bar{u}, qbar)}{\partial u_3} & \frac{\partial f_2(\bar{x}, \bar{u}, qbar)}{\partial u_4} \\ \frac{\partial f_3(\bar{x}, \bar{u}, qbar)}{\partial u_1} & \frac{\partial f_3(\bar{x}, \bar{u}, qbar)}{\partial u_2} & \frac{\partial f_3(\bar{x}, \bar{u}, qbar)}{\partial u_3} & \frac{\partial f_3(\bar{x}, \bar{u}, qbar)}{\partial u_4} \\ \frac{\partial f_4(\bar{x}, \bar{u}, qbar)}{\partial u_1} & \frac{\partial f_4(\bar{x}, \bar{u}, qbar)}{\partial u_2} & \frac{\partial f_4(\bar{x}, \bar{u}, qbar)}{\partial u_3} & \frac{\partial f_4(\bar{x}, \bar{u}, qbar)}{\partial u_4} \\ \frac{\partial f_5(\bar{x}, \bar{u}, qbar)}{\partial u_1} & \frac{\partial f_5(\bar{x}, \bar{u}, qbar)}{\partial u_2} & \frac{\partial f_5(\bar{x}, \bar{u}, qbar)}{\partial u_3} & \frac{\partial f_5(\bar{x}, \bar{u}, qbar)}{\partial u_4} \end{bmatrix}$$

As described above, the drogue state vector 34 and the dynamic pressure 36 are received by the control mixer, while the current actuator commands $u_i$ are those commands provided by the prior instance of the control authority matrix B. In this regard, i designates a respective actuator. Typically, the current actuator commands are represented by a vector $\bar{u}$ which includes a term defining the state to which each respective actuator is currently commanded.

Based upon the current actuator commands, $\bar{u}$, the anticipated changes in the plurality of states of the drogue are determined. In this regard, a drogue 14 that is in flight has a number of states $x_j$, including the hose elevation rate, hose azimuth rate, drogue pitch rate, drogue yaw rate, drogue roll rate and the like, wherein j represents the respective state in this instance. The current states of drogue are typically represented by a system state vector $\bar{x}$.

As indicated by block 68 of FIG. 4, the control matrix generates the dot product of each rate error, e.g., hose elevation rate error, hose azimuth rate error, drogue pitch rate error, drogue yaw rate error and drogue roll rate error, with the control authority matrix B in order to determine the actuator rate command $\dot{\bar{u}}(t)$ (designated as 46 in the embodiment of FIG. 3) required to reduce or eliminate the state errors 38. Since actuators are typically subject to at least some limitations, such as limitations in the permissible rate of change of the actuator, limitations may also be imposed upon the permissible change of each actuator such that the resulting commands issued to the actuators do not attempt to exceed the limitations of the actuators. Although different limitations may be imposed upon different actuators, the actuator rate commands may be limited, such as by means of a vector limiter 48, to prevent a respective actuator from being commanded to change at a rate that exceeds a predefined limit. In this regard, upper and/or lower limits may be predefined such that the permissible rate of change of the respective actuator must remain within the acceptable range bounded by the limit(s). See block 70 of FIG. 4.

In order to convert the rate of change of the actuator provided by the control authority matrix B to create the desired change in the state rates and, in turn, the state of the drogue 14 into actuator commands, the rates of change may be integrated as represented by $$\frac{1}{s}$$

with the resulting commands then also being limited such that each actuator remains within a predefined range. See block 50 of FIG. 3 and block 72 of FIG. 4. For example, the position of a control surface may be limited so as to remain within a predefined range of positions, as also typically defined by predetermined upper and lower limits.

Once the desired changes in the actuators have been appropriately limited to prevent any actuator from being commanded to exceed its predefined limits, the changes in each actuator that have been determined to effect the desired change in the state rates of the drogue are issued as commands to each of the actuators. See block 74 of FIG. 4. As such, the desired change in the state rates and, in turn, the desired change in the drogue state vector will be affected.

As described above, the method and apparatus of embodiments of the present disclosure may determine the desired state of each actuator in order to actively stabilize the controllable drogue 14, thereby compensating for nonlinear variation of the aerodynamic control effectiveness due to changes in the hose and drogue angular position, and the aircraft speed and altitude. Additionally, embodiments of the method and apparatus of the present disclosure may limit the rate of change of the commands to the actuators to constrain the command to lie within the command performance capabilities of the actuators. While an embodiment has been described heretofore that provides commands to four actuators carried by a refueling drogue, the method and apparatus of embodiments of the present disclosure may provide appropriate commands to a fewer or a greater number of actuators onboard a refueling drogue as well as taking into account a drogue state vector having more or fewer state rates. By improving the control authority over a refueling drogue and providing an improved trim envelope, a receiver aircraft may find it simpler to engage the drogue with a refueling probe, thereby increasing overall mission effectiveness and reducing the wear and tear on the drogue and receiver probe by reducing the drogue response to the bow wave created by the receiver aircraft and reducing the need to approach the drogue at a closing rate that is higher than otherwise desired.

As noted above, the control method including the control mixer of FIG. 3 may be automated and, as such, may be implemented by a computer, such as depicted in FIG. 2. In this regard, the computer of FIG. 2 includes processing circuitry that is configured to perform data processing, application execution and other processing and management services according to an exemplary embodiment of the present disclosure. For example, the processing circuitry may construct and implement the weighting matrix K and the control authority matrix B, as well as the rate limiting, integration and command limiting functions, as depicted in FIG. 3 and in blocks 66-74 of FIG. 4. The processing circuitry may be embodied as a circuit chip (e.g., an integrated circuit chip) configured (e.g., with hardware, software or a combination of hardware and software) to perform operations described herein. However, in some embodiments, the processing circuitry may be embodied as a portion of a server, computer, laptop, workstation, flight control computer or any one or more of various other computing devices.

In an exemplary embodiment, the computer of FIG. 2 also includes one or more memory devices 32 such as, for example, volatile and/or non-volatile memory that may be either fixed or removable. The storage device may be configured to store information, data, applications, instructions or the like for enabling the processing circuitry to carry out various functions in accordance with exemplary embodiments of the present disclosure. For example, the memory device could be configured to buffer input data for processing by the processing circuitry. Additionally or alternatively, the memory device could be configured to store instructions for execution by the processing circuitry.

In one embodiment, the processing circuitry may include a processor 30. The processor may be embodied in a number of different ways. For example, the processor may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an exemplary embodiment, the processor may be configured to execute instructions stored in the memory device 32 or otherwise accessible to the processor. As such, whether configured by hardware or software methods, or by a combination thereof, the processor may represent an entity (e.g., physically embodied in circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Embodiments of method and apparatus of the present disclosure may therefore be practiced using an apparatus such as depicted in FIG. 2. However, other embodiments may be practiced in connection with a computer program product configured to perform in accordance with embodiments of the present disclosure. In this regard, FIGS. 3 and 4, as described above, are illustrations of a method and program product according to exemplary embodiments. Each block or step of FIGS. 3 and 4, and combinations of blocks in FIGS. 3 and 4, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory device 32) and executed by processing circuitry (e.g., processor 30).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of controlling a refueling drogue comprising:
   receiving a respective error for at least one state associated with a hose including at least one of a hose elevation rate, a hose azimuth rate or a combination thereof and a respective error for at least one state associated with the drogue including at least one of a drogue pitch rate, a drogue yaw rate, a drogue roll rate or a combination thereof;
   weighting the respective error for at least one state associated with the hose or the drogue in order to prioritize one or more of the hose elevation rate, the hose azimuth rate, the drogue pitch rate, the drogue yaw rate or the drogue roll rate;
   receiving an indication of a current state of the drogue;
   determining, with a processor, a command to be issued to an actuator carried by the drogue based upon the current state of the drogue, the respective error, following weighting, for at least one state associated with the hose, the respective error, following weighting, for at least one state associated with the drogue and a current command that has been previously issued to the actuator; and
   issuing the command to the actuator to control the at least one state associated with the hose and the at least one state associated with the drogue.

2. A method according to claim 1 further comprising receiving a representation of dynamic pressure, and wherein determining the command to be issued to the actuator carried by the drogue is further based upon the dynamic pressure.

3. A method according to claim 1 wherein the refueling drogue comprises a plurality of actuators, wherein determining the command comprise determining the respective command to be issued to each of the plurality of actuators, and wherein issuing the command comprises issuing the respective command to each of the plurality of actuators.

4. An apparatus for controlling a refueling drogue, the apparatus comprising a processor configured to:
receive a respective error for at least one state associated with a hose including at least one of a hose elevation rate, a hose azimuth rate or a combination thereof;
receive a respective error for at least one state associated with the drogue including at least one of a drogue pitch rate, a drogue yaw rate, a drogue roll rate or a combination thereof;
weight the respective error for at least one state associated with the hose or the drogue in order to prioritize one or more of the hose elevation rate, the hose azimuth rate, the drogue pitch rate, the drogue yaw rate or the drogue roll rate;
receive an indication of a current state of the drogue;
determine a command to be issued to an actuator carried by the drogue based upon the current state of the drogue, the respective error, following weighting, for at least one state associated with the hose, the respective error, following weighting, for at least one state associated with the drogue and a current command that has been previously issued to the actuator; and
issue the command to the actuator to control the at least one state associated with the hose and the at least one state associated with the drogue.

5. An apparatus according to claim 4 wherein the processor is further configured to receive a representation of dynamic pressure, and wherein the processor is configured to determine the command to be issued to the actuator carried by the drogue based also upon the dynamic pressure.

6. An apparatus according to claim 4 wherein the refueling drogue comprises a plurality of actuators, wherein the processor is configured to determine the command by determining the respective command to be issued to each of the plurality of actuators, and wherein the processor is configured to issue the command by issuing the respective command to each of the plurality of actuators.

7. A refueling system comprising:
a refueling drogue comprising at least one actuator; and
a processor configured to:
receive a respective error for at least one state associated with a hose including at least one of a hose elevation rate, a hose azimuth rate or a combination thereof;
receive a respective error for at least one state associated with the drogue including at least one of a drogue pitch rate, a drogue yaw rate, a drogue roll rate or a combination thereof;
weight the respective error for at least one state associated with the hose or the drogue in order to prioritize one or more of the hose elevation rate, the hose azimuth rate, the drogue pitch rate, the drogue yaw rate or the drogue roll rate;
receive an indication of a current state of the drogue;
determine a command to be issued to the actuator based upon the current state of the drogue, the respective error, following weighting, for at least one state associated with the hose, the respective error, following weighting, for at least one state associated with the drogue and a current command that has been previously issued to the actuator; and
issue the command to the actuator to control the at least one state associated with the hose and the at least one state associated with the drogue.

8. A refueling system according to claim 7 wherein the refueling drogue comprises a plurality of actuators, wherein the processor is configured to determine the command by determining the respective command to be issued to each of the plurality of actuators, and wherein the processor is configured to issue the command by issuing the respective command to each of the plurality of actuators.

9. A refueling system according to claim 7 wherein the processor is further configured to receive a representation of dynamic pressure, and wherein the processor is configured to determine the command to be issued to the actuator carried by the drogue based also upon the dynamic pressure.

* * * * *